United States Patent [19]

Gordon et al.

[11] 4,269,116

[45] May 26, 1981

[54] APPARATUS FOR DETECTING MALFUNCTION IN TYING OPERATION ON A BALER

[76] Inventors: Goss E. Gordon, 1544 Julie La., Twin Falls, Id. 83301; David L. McMillen, Rt. 1, Eden, Id. 83325

[21] Appl. No.: 153,162

[22] Filed: May 27, 1980

[51] Int. Cl.³ .................. B65B 13/18; B30B 15/00
[52] U.S. Cl. ...................................... 100/99; 340/677
[58] Field of Search .................... 100/99; 200/61.18; 340/673, 674, 677

[56] References Cited

U.S. PATENT DOCUMENTS

| | | | |
|---|---|---|---|
| 1,098,602 | 6/1914 | Warman | 340/674 |
| 2,624,791 | 1/1953 | Krow | 100/99 X |
| 2,640,893 | 6/1953 | Stalzer | 100/99 X |
| 2,712,042 | 6/1955 | Nolt | 200/61.18 |
| 2,713,621 | 7/1955 | Hoffman | 200/61.18 |
| 2,824,184 | 2/1958 | Mandleco | 200/61.18 |
| 3,513,464 | 5/1970 | Yarbro | 100/99 X |
| 4,196,661 | 4/1980 | Yatcilla | 100/99 X |

Primary Examiner—Billy J. Wilhite

Attorney, Agent, or Firm—Terry M. Crellin; B. Deon Criddle

[57] ABSTRACT

Apparatus for detecting when the tying mechanism of a baler has failed to properly tie a cord or wire around a bale which has been formed in the baler, and further for producing an alarm for the operator of the baler that the tying mechanism is not functioning properly. The apparatus includes a sensor needle which is mounted for pivotal movement over one of the surfaces of the bale and beneath the tying cord which extends lengthwise along the surface of the bale of material which is being formed. If the tying mechanism has securely knotted the cord around the bale of material, the tied cord will engage the sensor needle and pivot the sensor needle back as the tied bale moves towards the discharge end of the bale forming chute. A clock mechanism is provided which activates an alarm if the sensor needle is not engaged and swung back within a preset time interval. If the cord around the bale has not been properly tied the cord will not engage the sensor needle to pivot it back and an alarm will be produced at the end of the preset time interval indicating that the tying mechanism is not functioning properly.

7 Claims, 6 Drawing Figures

APPARATUS FOR DETECTING MALFUNCTION IN TYING OPERATION ON A BALER

BACKGROUND OF THE INVENTION

1. Field:

The invention pertains to devices adapted to detecting when the tying mechanism of a baler apparatus has failed to properly tie a twine or wire around the bale of material which has been formed in the baler, and more particularly to such devices which provide an alarm which signals the operator of the baler whenever the tying mechanism fails to function properly.

2. State of the Art:

In the conventional balers, completed bales of hay or straw are banded either by twine or wire which is withdrawn from a supply thereof carried on the baler. The twine or wire passes from the supply, around the bale of material being formed in the baler, and to a needle or shuttle mechanism which passes the twine or wire across the bale chamber and around the rear end of the completed bale to deliver the twine or wire to a suitable tying mechanism which unites or ties the twine or wire carried by the needle or shuttle mechanism with the free end of the twine or wire previously formed around the bale. The tying operation can misfunction for various reasons. Weeds and sticks or other foreign matter can become entangled with the needle or shuttle mechanism and thereby prevent proper feeding of the twine or wire to the tying mechanism. In addition, foreign matter can clog the tying mechanism so that it does not function properly.

A mobile baler requires only one operator who drives the baler or the tractor or other vehicle to which the baler is attached. The operator guides the baler along the windrow, and the hay or straw is automatically picked up, baled, and the tied bales are dropped from the baler without manual assistanace. The operator cannot see the bales which are formed and dropped from the back of the baler without periodically stopping and walking to the back of the baler to look at the baler. As a practical matter, the operator cannot take time to stop numerous times to determine if the baler is functioning properly, but instead guides the baler along the windrow at a continuous speed. If the baler is malfunctioning, the operator is usually not aware of such until at least several improperly banded bales are dropped on the field. There is a need for a reliable device to signal the operator that the baler is malfunctioning and not producing properly tied bales.

Several devices have been suggested in the prior art for signaling the operator of the baler that the bale tying mechanism is not functioning properly. Generally, the prior devices have been associated with the feed mechanism of the baling wire and signals only when the supply of baling wire is exhausted. See, for example, U.S. Pat. Nos. 2,712,042 and 2,713,621. A rather elaborate, complicated system is disclosed in U.S. Pat. No. 2,824,184 which attempts to monitor the tension in the wire to actuate a switch mechanism operating a signal light which under ordinary operation cycles on and off due to the alternately applied tension in the baling wire. Malfunctioning of the tying mechanism is indicated by the signal light not going on or remaining on continuously. In U.S. Pat. No. 3,513,464 electrical continuity in the wire is monitored so as to indicate if the baling wire becomes broken or otherwise missing from the bale.

OBJECTIVES

A principal objective of the present invention is to provide a simple, reliable device which mechanically and positively monitors the tying of either twine or wire about the bale of material. An additional objective is to provide an alarm signal to the operator of the baler that the tying mechanism has failed to secure a twine or wire band about the bale while the bale is still positioned within the discharge chute of the baler, whereby the operator can stop the baler and hand tie a twine or wire band about the bale. Still further objectives of this invention are to provide a durable mechanism which is simple in construction, inexpensive to produce, and is capable of being readily and easily installed on various existing or new balers.

SUMMARY OF THE INVENTION

The above objectives are achieved by apparatus of the present invention which is adapted to positively and mechanically detect that a twine or wire band has been properly formed and tied about the bale of material in the discharge chute of the baler. The apparatus of the invention comprises a sensor needle or finger and means for pivotally mounting the sensor needle to the bale forming chute adjacent to the bale tying mechanism of the baler, so that the sensor needle is adapted for pivotal movement over one of the surfaces of the bale of material being formed in the chute of the baler. The sensor needle is adapted to swing from a first position extending generally toward the lead end of the bale, i.e., generally toward the discharge end of the bale chute of the baler, to a second position in which the sensor needle extends generally transverse to the longitudinal axis of the bale. In swinging to its second position, the sensor needle is also adapted to slide beneath a twine, cord, or wire which conventionally extends along the longitudinal surface of the bale of material which is being formed in the chute.

Means are provided for activating the sensor needle to swing from its first position to its second position as the tying mechanism of the baler begins its operation of tying the twine, cord, or wire as a band around the bale of material which has been formed in the chute of the baler. Means are also provided for holding the sensor needle in its second position after it has been swung to its second position until the twine, cord, or wire which has been banded around the bale of material engages the sensor needle and mechanically swings the sensor needle back towards its first position as the banded bale of material moves toward the discharge end of the baler.

Means are provided for detecting when the sensor needle swings into its second position as well as when it has been moved or swung back toward its first position. The time interval between the swinging of the sensor needle to its second position and its return to its first position is measured. An alarm is provided to the operator of the baler if the sensor needle has not been swung back toward its first position within the preset time interval. In instances when the tying mechanism fails to make a secure knot in the twine, cord, or wire banded around the bale or for some other reason, the twine, cord, or wire is not properly banded around the bale, the sensor needle will be held in its second position inasmuch as there will be no sound band around the bale to engage and swing the sensor needle back towards its first position. Thus, the sensor needle will be held in its second position beyond the preset time interval, and the alarm is activated.

Additional objectives and features of the invention will become apparent from the following detailed description of a preferred embodiment of the invention, with reference to the accompanying drawings.

THE DRAWINGS

A preferred embodiment of the signal device or apparatus of the present invention representing the best mode presently contemplated of carrying out the invention in actual practice is illustrated in the accompanying drawings, in which.

DETAILED DESCRIPTION OF THE ILLUSTRATED EMBODIMENT

Figure 1:
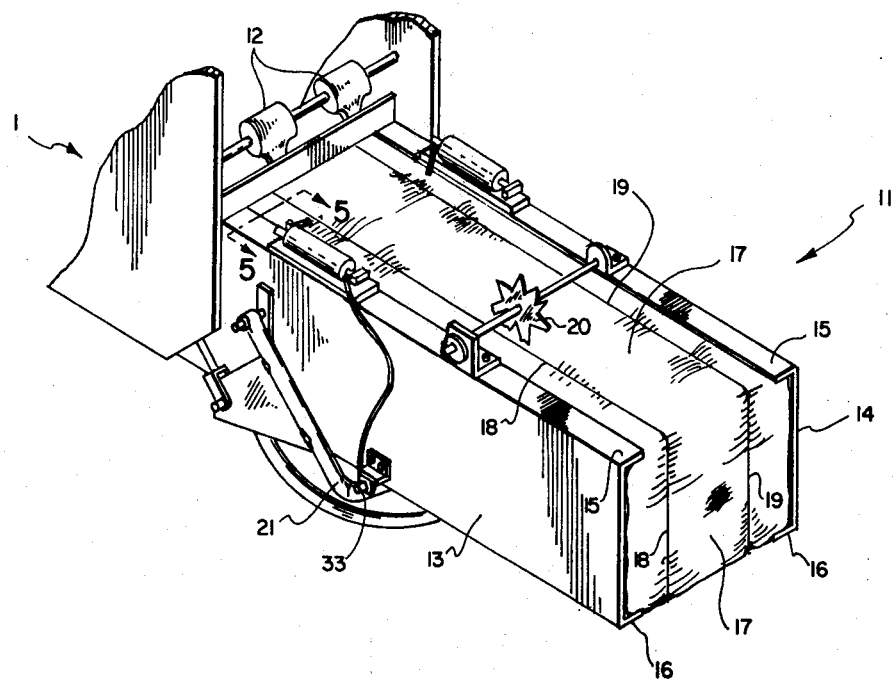
FIG. 1 is a partial pictorial view of a baler showing the bale forming chute with the detecting and alarm system of the present invention attached thereto.

Referring to the drawings, in FIG. 1 there is shown a portion of a conventional hay and straw baler 1. As shown, the baler 1 has a bale chute 11. Mounted adjacent the inlet end of the bale chute 11 are two baling twine holding and tying mechanisms 12. The bale chute 11 is of the customary type having a pair of opposed side walls 13 and 14, each with inwardly facing upper and lower flanges 15 and 16, respectively.

As shown in FIG. 1, the bale chute 11 is elongated and is generally rectangular in transverse section between side walls 13 and 14 and upper and lower flanges 15 and 16 and has a generally open top. A bale 17 formed by the baler is comprised of a product such as straw or hay which is compressed to generally rectangular parallelepiped form and bound with bale twines 18 and 19. In recent balers, the banding material is twine and thus in the remaining portion of this description it will be referred to as twine. However, it is to be recognized that wire as used in older balers and any cord in general can be used with the detecting and alarm apparatus of the present invention. Bale twines 18 and 19 extend completely around the bale 17 longitudinally of the bale chute 11, with the twines being parallel and in spaced relationship with each other.

Although the baler per se forms no part of this invention and balers of this type are old and well known in the art, the operation of the baler will be briefly described to facilitate understanding of the operation of the detecting and alarm apparatus of the present invention. Each of the bale twines 18 and 19 initially have their ends held by the holding and tying mechanisms 12 with the twines extending vertically through the bale chute 11 and passing through respective guides (not shown) mounted on the baler slightly below the bale chute 11. The twines 18 and 19 are connected to supply coils (not shown) from which the twine is withdrawn as the bale 17 is being formed. Hay or straw is fed intermittently to the inlet end of the bale chute 11 by a plunger (not shown). During each stroke of the plunger, a certain additional amount of hay or straw is forced into the bale chute 11 and the forward end of the bale 17 which is being formed moves intermittently towards the discharge end of the chute 11. As the forward end of the bale 17 passes through the chamber, additional twine is pulled from the respective supply coils so as to extend around the top, front or leading end, and bottom of the bale 17. When a bale of sufficient length has been formed as determined by a metering device 20, shown as a customary toothed wheel that rotates as the bale of hay or straw is pushed through the chute 11, a needle mechanism, shown generally by the numeral 21, engages the twines 18 and 19 at the bottom of the bale 17 and lifts the twines upwardly to a position where the respective twines are gripped by the holding and tying mechanisms 12. The needle mechanism 21 thus provides two generally inverted U-shaped lengths of twine at the trailing end of the bale 17, and the tying mechanisms 12 then tie the U-shaped lengths of twine to the end of the respective twines held by the mechanisms 12 to form two closed loops around the bale 17. The tying mechanisms then sever the twines which are still connected to the supply coils from the tied, closed loops and the severed end of the twines are gripped by the holding and tying mechanisms 12. The needle mechanism 21 drops back to its original position and a new bale 17 is begun by the action of the plunger forcing amounts of hay or straw intermittently into the feed end of the chute 11.

The detecting and warning apparatus of the present invention is illustrated in detail in FIGS. 2–7 and shown attached to the baler in FIG. 1. As shown in FIG. 1, two detecting and warning devices are needed, one for each twine which is to be banded around the bale 17. It is to be recognized that some balers form three tie bands around the bale, and with such balers three detecting systems of the present invention would be used. Generally, a separate and distinct detecting device in accordance with this invention is used for each band which is to be tied around the bale formed in the baler. However, each detecting and warning device is identical to the other in construction and operation, and, thus, for simplicity only one device will be described in detail.

As illustrated, the detecting and alarm apparatus comprises a mounting plate 22 which is securely attached to one of the upper flanges 15 of the sides of the chute 11. A sensor needle 23 is pivotally attached to the mounting plate 22 for movement of the sensor needle 23 generally over the surface of the bale 17 which is being formed in the chute 11. As shown, an upwardly extending post 24 (FIG. 4) is attached at one of its ends to the mounting plate 22, and a sleeve 25 is fitted coaxially over the post 24 so that the sleeve 25 can turn coaxially about the post 24. One end of the sensor needle 23 is attached to the sleeve 24, with the other end of the sensor needle extending outwardly from the sleeve 25 so that when the sleeve 25 turns about the post 24, the free end of the sensor needle 23 moves over the surface of the bale 17.

Figure 2:
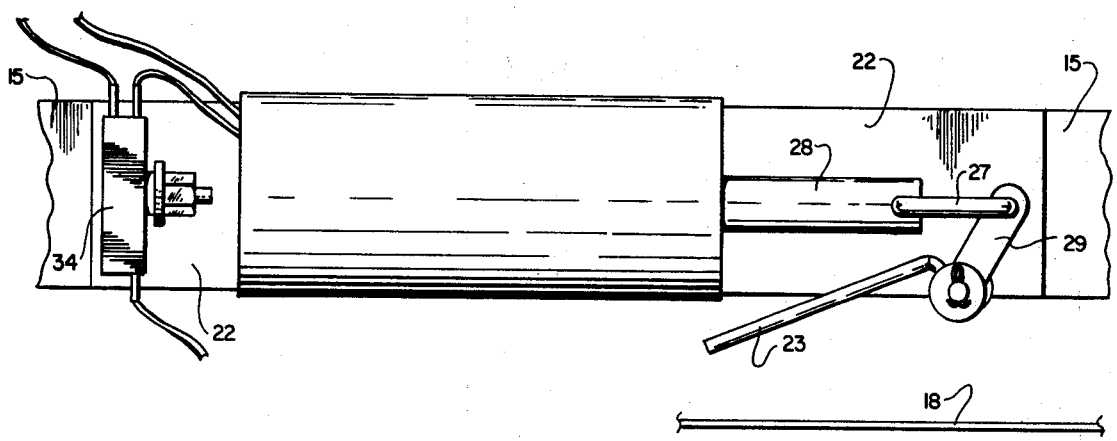
FIG. 2 is an enlarged top view of the needle sensor mechanism and solenoid operator portion of the detecting and alarm system of FIG. 1, showing the sensor needle in its first position, i.e., pointing generally towards the lead end of the bale and the discharge end of the bale forming chute.
Figure 3:
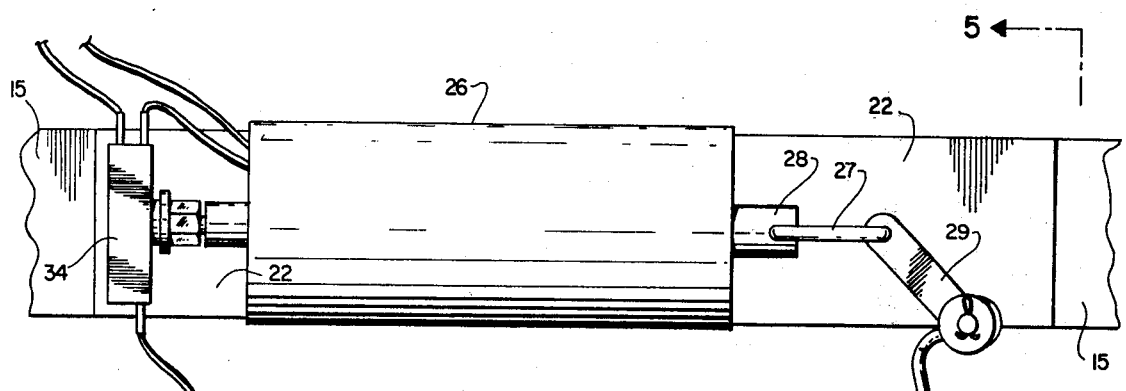
FIG. 3 is a view similar to that of FIG. 2, showing the sensor needle in its second position, i.e., pointing across the bale in a direction generally transverse to the longitudinal axis of the bale.
Figure 4:
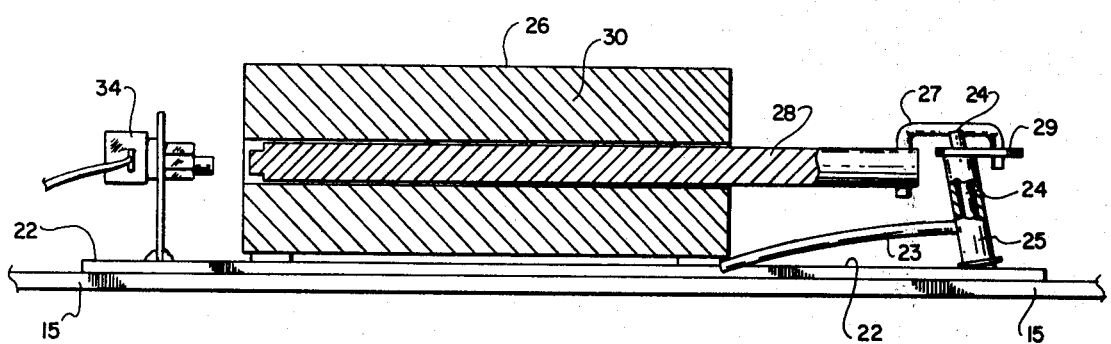
FIG. 4 is an enlarged vertical section partially in section of the needle sensor mechanism and solenoid operator portion of the detecting and alarm system of FIG. 1 showing its mounting of the top flange of the bale forming chute.
Figure 5:
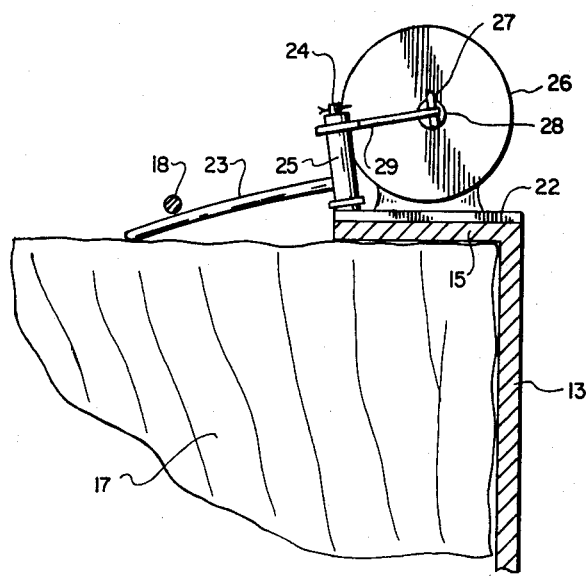
FIG. 5 is a partial cross-sectional view taken along line 5—5 of FIGS. 1 and 3.

Means are provided for pivotally moving the sensor needle 23 over the surface of the bale 17 such that the sensor needle swings from a first position, as shown in FIGS. 2 and 4, in which it points generally toward the lead end of the bale which is being formed in the chute, to a second position, as shown in FIGS. 3 and 5, in which the sensor needle points across the bale in a direction generally transverse to the longitudinal axis of the bale and beneath the twine 18 (see FIG. 5) which extends lengthwise along the longitudinal surface of the bale. A solenoid 26, which is firmly attached to the mounting plate 22, is preferably used as the motive means in pivotally moving the sensor needle 23. A link arm 27 is connected between the trailing end of the armature 28 of the solenoid 26 and a lever 29 which extends outwardly from the sleeve 25. When the armature 28 is drawn into the coil 30 of the solenoid 26, the lever is moved so as to swing the sensor needle 23 from its first position to its second position.

The solenoid 26 is activated so as to draw the armature 28 into the coil 30 by a switch 33 which is turned on as the tying mechanism of the baler initiates the operation of tying the twine around the trailing end of the bale of material which has been formed in the chute 11 of the baler. In a preferred arrangement, the switch 33 is mounted on the baler adjacent to the needle mechanism 21 so that when the needle mechanism is in its lowered position, i.e., the position it assumes as the bale of material is being formed in the chute 11, the switch 33 is inactivated. When the needle mechanism begins its upward movement to tie the twine around the fully formed bale, the switch 33 is activated and the solenoid is energized so as to pull the armature 28 into the coil 30.

It is advantageous to use a dual wound coil 30 in the solenoid inasmuch as the initial pull on the armature needs to be considerably greater than the pull necessary to hold the armature 28 within the coil 30 after it has been drawn thereinto. The primary winding, which provides the initial pull on the armature, is advantageously energized only momentarily so as to provide the initial pull necessary to draw the armature 28 into the coil 30. This winding is then either de-energized or the current therein is reduced as is explained hereinafter with respect to the electrical circuitry of the system. Preferably, a secondary winding is used independantly or in series with the primary winding and is energized as the armature 28 is drawn into the coil. For this purpose, a timing switch 34 is provided at the end of the solenoid so that the leading end of the armature 28 will activate the timing switch 34 when the armature is drawn into the coil 30. In operation of the solenoid, the primary winding of solenoid 26 is energized momentarily as the needle mechanism moves upwardly to tie the twine around the bale. As the needle mechanism moves back down after tying the twine the switch 33 is turned off. But, the secondary winding of the coil has been energized when the armature 28 is drawn into the coil 30 and holds the armature 28 within the coil after the needle mechanism has turned switch 33 off.

The armature 28 will be held in its position within the coil until a force sufficient to overcome the pull of the secondary winding is applied on the armature by the sensor needle 23. If the tying mechanism has properly tied the twine around the bale, the twine will engage the end of the sensor needle 23 as the bale moves towards the discharge end of the chute 11, and the tied twine will force the sensor needle 23 to move backwards in a direction from its second position toward its first position. As the sensor needle 23 moves backward, the lever 29 and link arm 27 pull the armature out of the coil. The timing switch 34 is turned off as the armature 28 moves away from the switch 34, and the coil 30, including both the primary and secondary winding are de-energized. After the coil 30 has been de-energized, the bale of material 17 pulls the sensor needle fully back to its first position and ready to test the proper tying of the next bale of hay or straw which is formed in the chute 11.

The timing switch 34 is also used to measure the time interval between the initial activation of the solenoid 26 and the time when the sensor needle 23 is engaged by the properly tied twine on the bale. A clock mechanism is provided which begins to measure the time interval as switch 34 is activated by the armature 28 and concludes the time measurement when the armature is pulled back from the switch 34. The clock mechanism is also adapted to compare the measured time interval with a preset time interval. If the tying mechanism of the baler fails to tie the twine in a continuous, sound loop around the bale in the chute 11, the sensor needle 23 will not be engaged sufficiently as the bale moves towards the discharge end of the chute 11 to force the sensor needle 23 to pivot from its second position toward its first position, and the timing switch 34 will remain on. The clock mechanism will continue to measure the measured time interval and is adapted to produce an output signal when the measured time interval exceeds the preset time interval. The output from the clock mechanism activates an alarm signaling the operator of the baler that the tying mechanism has failed to properly tie the bale of hay or straw in the chute 11. The operator of the baler can then stop and hand tie the improperly tied bale, so that the bale is discharged in sound, tied condition. Of course, the operator would also discern and correct the cause of the malfunction in the tying mechanism.

The sensor needle 23 and associated solenoid 26 are preferably mounted closely adjacent to the feed end of the bale forming chute 11 near the tying mechanisms 12 so as to minimize the time delay between tying of the bale 17 and when the properly tied twine engages the sensor needle 23. The apparatus is mounted to the bale forming chute 11 so that the pivot axis of the sensor needle, i.e., post 24, is canted slightly towards the discharge end of the bale forming chute and slightly towards the longitudinal axis of the bale forming chute 11 so as to facilitate the swinging movement of the sensor needle 23 to its position between the twine 18 and the surface of the bale 17 as shown in FIGS. 3 and FIG. 5. The free, tip end of the sensor needle is also preferably bent downwards as shown in FIGS. 4 and 5 towards the surface of the bale 17 so as to further facilitate the swinging of the sensor needle beneath the twine 18.

Figure 6:
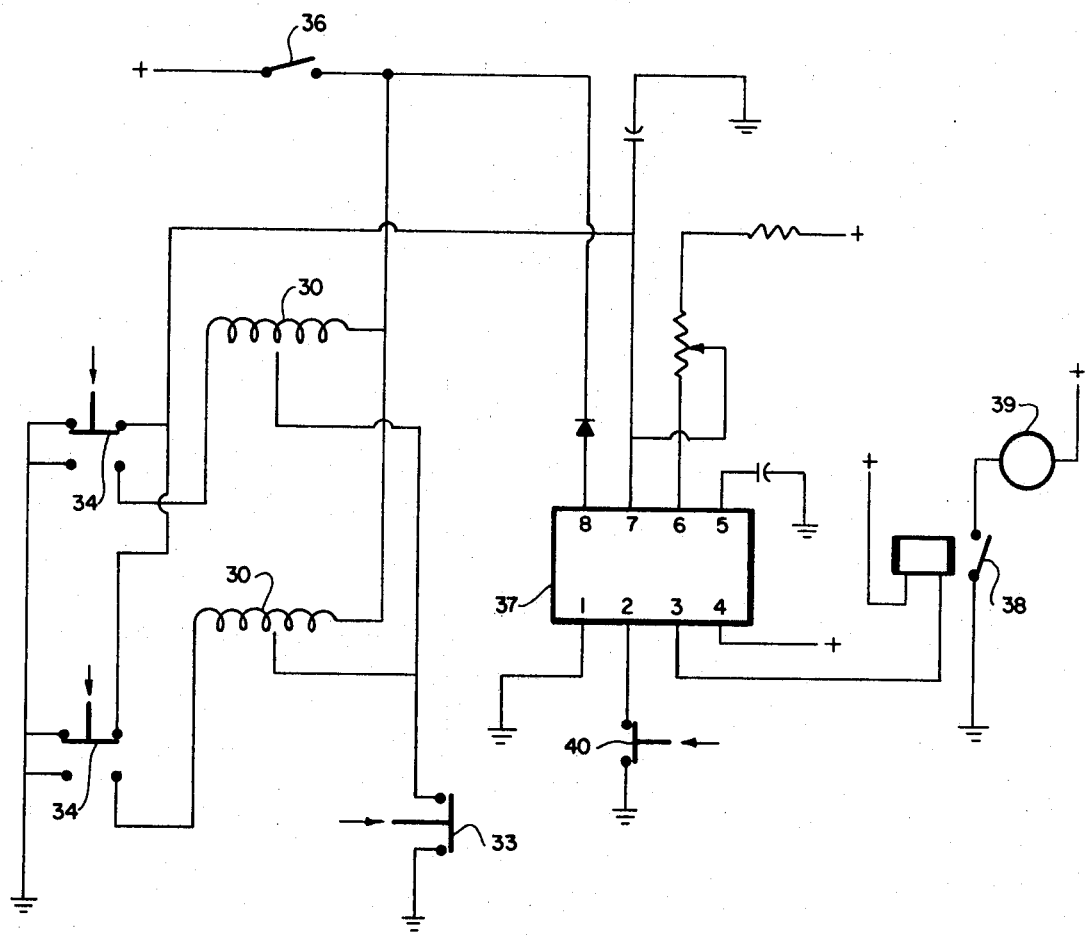
FIG. 6 is an electrical schematic of the detecting and alarm system of this invention as illustrated.

In FIG. 6 there is shown an electrical schematic of the apparatus of this invention. The circuitry is shown including two solenoid systems (one solenoid system for each twine tying mechanism on the baler). The leads indicated by + signs are to be connected to a positive, 12 volt electrical source, such as the positive terminal of a conventional automotive battery. A master on-off switch 36 provides electrical connection from the 12 volt, positive source to the coils 30 of the solenoids. The coils 30 are wound so as to provide two windings in each coil, the secondary winding being tapped so as to form a primary winding comprising only a portion of the total windings in the coils 30. It is to be understood that separate coils could be used to form the primary and secondary windings; however, the tapped windings are more economical.

The primary windings comprising the tapped portions of the coils 30 are connected in parallel to switch 33. The switch 33 is normally open. The needle mechanism 21 depresses the switch 33 and maintains the switch 33 in open position until the tying operation begins, with the needle mechanisms moving upward so as to release the switch 33 and close it. When the switch 33 closes, the primary windings are energized, and as explained above the armatures 28 of the solenoids are drawn into the coils 30 and, thus, pivot the sensor needles 23 from their first positions to their second positions.

As the armatures are drawn into the coils 30 they depress timing switches 34 which are connected in parallel to ground. Each of the switches 34 have a pair of normally open contacts and a pair of normally closed contacts. The normally closed contacts are connected in series between ground and an integrated circuit device which is to be described hereinafter. The normally open contacts are connected in series between the secondary windings of coils 30 and ground. Thus, as the switches 34 are depressed by the armatures 28 of the solenoids 26, the secondary windings are energized. Until the needle mechanisms 21 return to their rest position following the tying operation, the main flow of current continues to pass through the primary windings and the switch 33. But when the needle mechanisms 21 return to their rest position, usually within one to no more than two or three seconds after having been activated in the tying operation, the switch 33 is closed, and the flow of current in the coils 30 passes through the secondary windings and switches 34 to ground. The secondary winding has more resistance than the primary and thus the current through the secondary windings is less than when the current passes through the primary windings only. The larger current flow in the primary windings produces the increased pull on the armatures 28 as explained hereinabove to move the sensor needles 23 to their positions beneath the twines 18 and 19. The smaller current flow in the secondary windings provides sufficient pull on the armatures 28 to hold the sensor needles 23 in position beneath the twines 18 and 19 until the properly tied twines engage the sensor needles 23 and move them backward against the pull of the armatures 28. As the tied twines pull the sensor needles 23 the switches 34 return to their undepressed state, and the coils 30 are de-energized. The sensor needles 23 then return to their initial position, i.e., their first position, by the movement of the bale of hay or straw as described hereinbefore.

The timing switches 34 are connected to a timing chip 37, such as a conventional 555 device. The timing chip 37, in combination with the timing switches 34, is adapted to measure the time duration between when the sensor needles 23 are pivoted to their second positions beneath the twines 18 and 19 and when the tied twines move the sensor needles back toward their first position. As illustrated, the positive electrical source is connected through a diode to pin 8 of the 555 device. Pin 7 is connected in parallel through the timing switches 34 to ground and through a capacitor to ground. A capacitor having a value of about 10 uf will give good time measuring control when combined with a potentiometer connected between pin 7 and pin 6 of the 555 device. As is well known in the art, various combinations of resistances and capacitances can be used with the 555 device and the choice of various resistances and capacitances to achieve desired timing measurements is a matter of choice. Generally, a 10 uf capacitor as mentioned above will give adequate results when used with a 100 k ohm resistor connected in series with the potentiometer to pin 6 of the 555 device.

When either of the switches 34 are depressed by the armatures 28 being pulled into the coils 30 of solenoids 26, the normally closed contacts thereof, which are connected in series between pin 7 of the 555 device and ground, are opened, and the 555 device begins measuring time and comparing the time to a preset interval which is set by adjusting the potentiometer connected to pin 6 of the 555 device. The preset interval is set so as to be just somewhat greater than the time required for the properly tied twines on bale 17 to move from the tying mechanisms 12 and engage the sensor needles 23 as the bales move through the chute 11 of the baler. When the properly tied twines engage the sensor needles 23, the timing switches 34 are released and the normally closed contacts connected in series between pin 7 of the 555 device and ground return to their closed positions. If the time duration between the opening and closing of the contacts of switches 34 is less than the preset interval, the 555 device resets itself to ready status for timing the next open interval of the switches 34. However, if either of the tying mechanisms 12 fail to tie the twines 18 and 19 in sound bands around the bale 17, the improperly or untied twine will not engage the corresponding sensor needle 23 with sufficient force to overcome the pull of the solenoid 26. Thus, the sensor needle 23 will remain held in its second position, and the 555 device will produce an output signal after the lapsing of the preset time interval inasmuch as the contacts of the corresponding switch 34 will not have closed within the preset time interval. The output signal is produced at pin 3 of the 555 device and is used to activate a relay switch 38. The relay switch 38 completes a circuit comprising an alarm such as a bell or buzzer 39. The bell or buzzer 39 gives an audible signal to the operator that the tying mechanism has failed to produce a sound, well tied bale, and the operator can stop the baler and hand tie twine around the bale of hay or straw in the chute 11. The tying mechanism can also be checked to correct the cause of the malfunction before the baling operation continues. A visual signal comprising a warning light can be included with the bell or buzzer 39 or can be used in place of the bell or buzzer 39. The bell or buzzer 39 can be turned off and the timing device 555 reset to ready status by activating a switch 40 which impresses a ground potential on pin 2 of the 555 device. As is common in circuits using the 555 device, pin 1 thereof is connected to ground and pin 4 is connected to a source of positive electrical charge. Further, a capacitor can be connected between pin 5 and ground as is well known in using the 555 device to prevent electrical interference from affecting the accuracy of the timing function. A capacitor of about 0.01 uf is satisfactory for this purpose.

In the preferred embodiment of the invention as illustrated, the solenoid 26 has its windings formed on a copper conduit having an inside diameter of about 13/16 inch, with the conduit being about $4\frac{1}{2}$ inches long. An outer casing of tubing having an inside diameter of about $2\frac{1}{2}$ inches fits coaxially over the windings and inner conduit. Two washers having a $\frac{7}{8}$ inch inside diameter and an outside diameter of 25/16 inches cover the respective ends of the coaxially tubings and coil wrapped therebetween. The armature 28 is made of ⅜ inch cold rolled rod having a length of about 4⅝ inches. By increasing or decreasing the length of the armature which extends from the coil 30, the break away pull required to withdraw the armature from the solenoid is increased or decreased.

The primary winding in the preferred embodiment comprises a pair of wires in parallel, each wire being 21 guage and about 350 feet in length. Such a winding has about 3 ohms resistance and draws about 6 amps current when a voltage of 12 volts is impressed thereacross. The secondary winding comprises a single strand, 21 guage wire of about 280 feet, which as described with respect to FIG. 6, is a continuation of the primary winding. The total resistance of the secondary winding is about 5 ohms, and the secondary winding draws about 2.2 amps when a voltage of 12 volts is impressed thereacross.

It is to be understood that the present disclosure, including the detailed description of a preferred embodiment of the invention, is made by way of example and that various other embodiments are possible without departing from the subject matter coming within the scope of the following claims, which subject matter is regarded as the invention.

We claim:

1. Apparatus for detecting when the tying mechanism of a baler has failed to properly tie a twine, cord, or wire around the bale which has been formed in the baler and for producing an alarm for the operator of the baler that the tying mechanism is not functioning properly, said apparatus comprising:

a sensor needle or finger;

means for pivotally mounting the sensor needle to the bale forming chute of a baler, so that the sensor needle is adapted for pivotal movement over one of the surfaces of the bale of material being formed in the baler, whereby the sensor needle swings from a first position pointing generally toward the lead end of the bale which is being formed to a second position pointing across the bale in a direction generally transverse to the longitudinal axis of the bale and beneath a twine, cord, or wire extending lengthwise along the longitudinal surface of the bale of material which is being formed;

means for pivotally moving the sensor needle to swing from its first position to its second position as the tying mechanism of the baler begins its operation of tying the twine, cord or wire around the bale of material which has been formed in the baler;

means for holding the sensor needle in its second position beneath the twine, core, or wire which has been tied around the bale of material until the tied twine, core, or wire engages the sensor needle and swings the sensor needle back toward its first position as the bale of material moves toward the discharge end of the baler;

means for detecting when the sensor needle has been moved back toward its first position;

means for sensing the time interval between the time when the sensor needle swings to its second position and when it is swung back toward its first position by the twine, cord, or wire tied around the bale of material; and means for giving an alarm to the operator of the baler if the sensor needle has not been swung back toward its first position within a preset time interval.

2. Apparatus in accordance with claim 1, wherein the means for pivotally moving the sensor needle to swing from its first position to its second position comprises:

a lever extending from the pivot axis of the sensor needle and adapted to swing the sensor needle from its first position to its second position as the lever is moved;

a solenoid;

a link arm connecting the armature of the solenoid to the outwardly extending end of the lever; and a switch which activates the solenoid at the time the tying mechanism of the baler begins its operation of tying the twine, cord, or wire around the bale of material, whereby the armature is drawn into the coil of the solenoid thereby moving the lever so as to swing the sensor needle from its first position to its second position.

3. Apparatus in accordance with claim 2, wherein the switch is associated with the mechanism for operating the knotting needles of the baler, so that the switch is turned on as the knotting needles begin their operation in tying the twine, cord, or wire around the bale of material.

4. Apparatus in accordance with claim 2 wherein the solenoid has a coil comprising primary and secondary winding with the primary winding being energized momentarily by the switch which is activated by the tying mechanism of the baler, and a second switch is provided in combination with the solenoid, said second switch being activated when the armature of the solenoid is drawn into the coil of the solenoid, with the secondary winding being energized when the second switch is activated, whereby the primary winding provides a strong initial field to draw the armature into the winding and the secondary winding provides a smaller but sufficient field to hold the armature within the coil after it has been drawn thereinto by the larger field produced by the initial field of the primary winding.

5. Apparatus in accordance with claim 2, wherein the solenoid is provided with a timing switch which is turned on when the armature of the solenoid is drawn into the coil of the solenoid and turned off when the armature is withdrawn from the coil of the solenoid, and further wherein the means for sensing the time interval between the time when the sensor needle swings to its second position and when it is swung back to its first position comprises an electronic clock circuit which begins to measure the time interval when the timing switch is turned on, said electronic clock circuit being adapted to reset itself to ready status if the timing switch is turned off within the preset time interval and to produce an alarm signal if the timing switch is not turned off within the preset time interval, with the alarm signal activating the alarm means.

6. Apparatus in accordance with claim 1, wherein the sensor needle is mounted to the bale forming chute so that the pivot axis about which the sensor needle pivots is canted slightly towards the discharge end of the bale forming chute and slightly towards the longitudinal axis of the bale forming chute so as to facilitate the swinging movement of the sensor needle between the twine, cord, or wire and the surface of the bale of material.

7. Apparatus in accordance with claim 6, wherein the free, tip end of the sensor needle is bent downward toawards the surface of the bale of material so as to further facilitate the swinging of the sensor needle beneath the twine, cord, or wire.

* * * * *